(12) United States Patent
Schafer

(10) Patent No.: US 9,302,726 B1
(45) Date of Patent: Apr. 5, 2016

(54) HELMET BRACKET AND MOTORCYLE FLOORBOARD MOUNT KIT

(71) Applicant: Charles Schafer, Converse, IN (US)

(72) Inventor: Charles Schafer, Converse, IN (US)

( * ) Notice: Subject to any disclaimer, the term of this patent is extended or adjusted under 35 U.S.C. 154(b) by 0 days.

(21) Appl. No.: 14/830,460

(22) Filed: Aug. 19, 2015

(51) Int. Cl.
*B62J 7/08* (2006.01)
*B62J 11/00* (2006.01)

(52) U.S. Cl.
CPC ................ *B62J 11/005* (2013.01); *B62J 11/00* (2013.01)

(58) Field of Classification Search
CPC ................................. B62J 11/005; B62J 11/00
USPC .................................... 248/205.1, 200, 309.1
See application file for complete search history.

(56) References Cited

U.S. PATENT DOCUMENTS

| 3,837,545 A | 9/1974 | Rogers, Jr. |
| 5,127,561 A | 7/1992 | Miyamoto |
| 8,002,125 B2 | 8/2011 | Van Wyk |

*Primary Examiner* — Nkeisha Smith
(74) *Attorney, Agent, or Firm* — Crossley Patent Law

(57) ABSTRACT

A helmet bracket and motorcycle floorboard mount kit including a pair of L-shaped first mounting brackets. Each of the pair of first mounting brackets has a pair of first threaded apertures and a pair of second threaded apertures. One of a pair of first mounting bolts threadably engages each of the pair of first apertures, and one of a pair of second mounting bolts threadably engages each of the pair of second apertures. A right mounting bracket and a left mounting bracket of the pair of mounting brackets removably attaches to a top side of a right side and a left side, respectively, of a motorcycle passenger floorboard. A second cylindrical mounting bracket having a continuous notch and a threaded opening is removably attachable to a motorcycle. The second mounting bracket is configured to releasably hang a helmet.

3 Claims, 5 Drawing Sheets

HELMET BRACKET AND MOTORCYLE FLOORBOARD MOUNT KIT

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of motorcycle attachments are known in the prior art. However, what has been needed is a helmet bracket and motorcycle floorboard mount kit including a pair of identical L-shaped first mounting brackets, with each of the pair of first mounting brackets having a pair of first threaded apertures, a pair of second threaded apertures, a pair of first mounting bolts, and a pair of second mounting bolts. The pair of first mounting bolts of each of the pair of first mounting brackets and the pair of second mounting bolts of each of the pair of first mounting brackets are configured to removably attach a right mounting bracket of the pair of first mounting brackets to a top surface of a right side of a pair of motorcycle passenger floorboards and a left mounting bracket of the pair of first mounting brackets to a top surface of a left side of the pair of motorcycle passenger floorboards. What has been further needed is a second mounting bracket having a continuous notch and a threaded opening. A third mounting bolt removably attaches the second mounting bracket to a motorcycle. Lastly, what has been needed is for each of the right mounting bracket and the left mounting bracket of the pair of first mounting brackets to forwardly extend each of the right side and the left side, respectively, of the pair of motorcycle such that the first mounting bracket is configured to forwardly extend the motorcycle passenger floorboard approximately 2.5 inches, and the second mounting bracket is configured to releasably hang a helmet. The kit thus provides a passenger on a motorcycle with a more comfortable seating position by forwardly extending a pair of motorcycle passenger floorboards. The second mounting bracket of the kit also provides a motorcycle rider with an easy and convenient way to hang and store his helmet while the helmet is not in use.

FIELD OF THE INVENTION

The present invention relates to attachments for motorcycles, and more particularly, to a helmet bracket and motorcycle floorboard mount kit.

SUMMARY OF THE INVENTION

The general purpose of the present helmet bracket and motorcycle floorboard mount kit, described subsequently in greater detail, is to provide a helmet bracket and a motorcycle floorboard mount which have many novel features that result in a helmet bracket and motorcycle floorboard mount kit which is not anticipated, rendered obvious, suggested, or even implied by prior art, either alone or in combination thereof.

To accomplish this, the present helmet bracket and motorcycle floorboard mount kit includes a pair of identical L-shaped first mounting brackets. Each of the pair of first mounting brackets has a front surface, a left side surface perpendicularly disposed to the front surface, a right side surface perpendicularly disposed to the front surface, a curved right rear surface, and a left rear surface perpendicularly disposed to the left side surface. Each of the pair of first mounting brackets further comprises a pair of first threaded apertures and a pair of second threaded apertures. The pair of first apertures is continuously disposed from the front surface proximal the left side surface to the left rear surface. A top first threaded aperture of the pair of first apertures is disposed parallel to a bottom first threaded aperture of the pair of first apertures. The pair of second apertures is continuously disposed from front surface proximal the right side surface to the right rear surface. A top second threaded aperture of the pair of second apertures is disposed parallel to a bottom second threaded aperture of the pair of second apertures.

One of a pair of first mounting bolts is configured to selectively threadably engage each of the pair of first apertures, and one of a pair of second mounting bolts is configured to selectively threadably engage each of the pair of second apertures. The pair of first mounting bolts of each of the pair of first mounting brackets and the pair of second mounting bolts of each of the pair of first mounting brackets are configured to removably attach a right mounting bracket of the pair of first mounting brackets to a top surface of a right side of a pair of motorcycle passenger floorboards and a left mounting bracket of the pair of first mounting brackets to a left side of the pair of motorcycle passenger floorboards.

A height of each of the pair of first mounting brackets from the front surface of the first mounting bracket to the left rear surface of the first mounting bracket is approximately 2.5 inches, and a length of each of the pair of first mounting brackets from the left side surface of the first mounting bracket to the right side surface of the first mounting bracket is approximately 4 inches. These dimensions allow the first mounting bracket to be configured to forwardly extend the motorcycle passenger floorboard approximately 2.5 inches.

The present helmet bracket and motorcycle floorboard mount kit further includes a second cylindrical mounting bracket. The second mounting bracket has a top surface, a bottom surface, and an exterior surface. A continuous notch is substantially medially disposed between the top surface of the second mounting bracket and the bottom surface of the second mounting bracket on the exterior surface of the second mounting bracket. A threaded opening is continuously disposed from the top surface of the second mounting bracket to the bottom surface of the second mounting bracket. A third mounting bolt is configured to selectively threadably engage the opening and removably attach the second mounting bracket to a rear side of a motorcycle.

A height of the second mounting bracket is approximately 2.5 inches, and a diameter of the second mounting bracket is approximately 1.125 inches. These dimensions configure the second mounting bracket to releasably hang a helmet. The first mounting bracket and the second mounting bracket are optionally aluminum.

Thus has been broadly outlined the more important features of the present helmet bracket and motorcycle floorboard mount kit so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
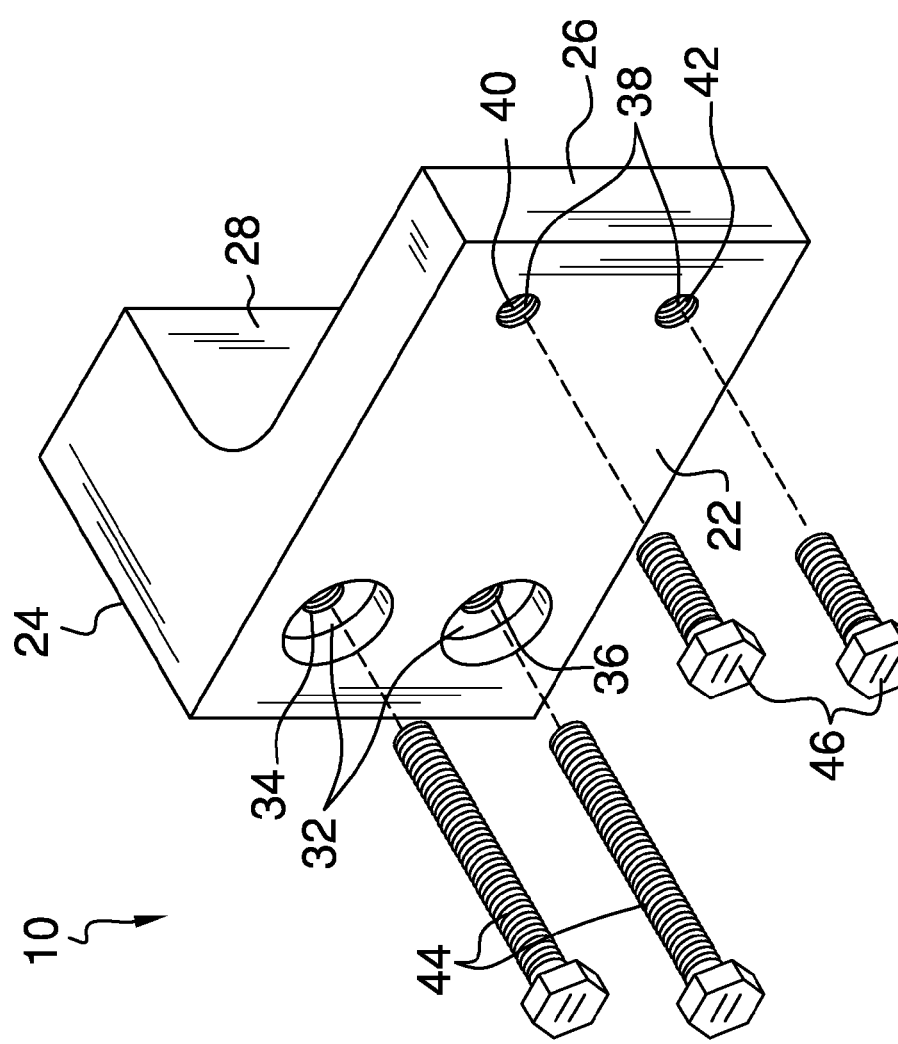
FIG. 1 is a front isometric view showing a pair of L-shaped first mounting brackets.
Figure 2:
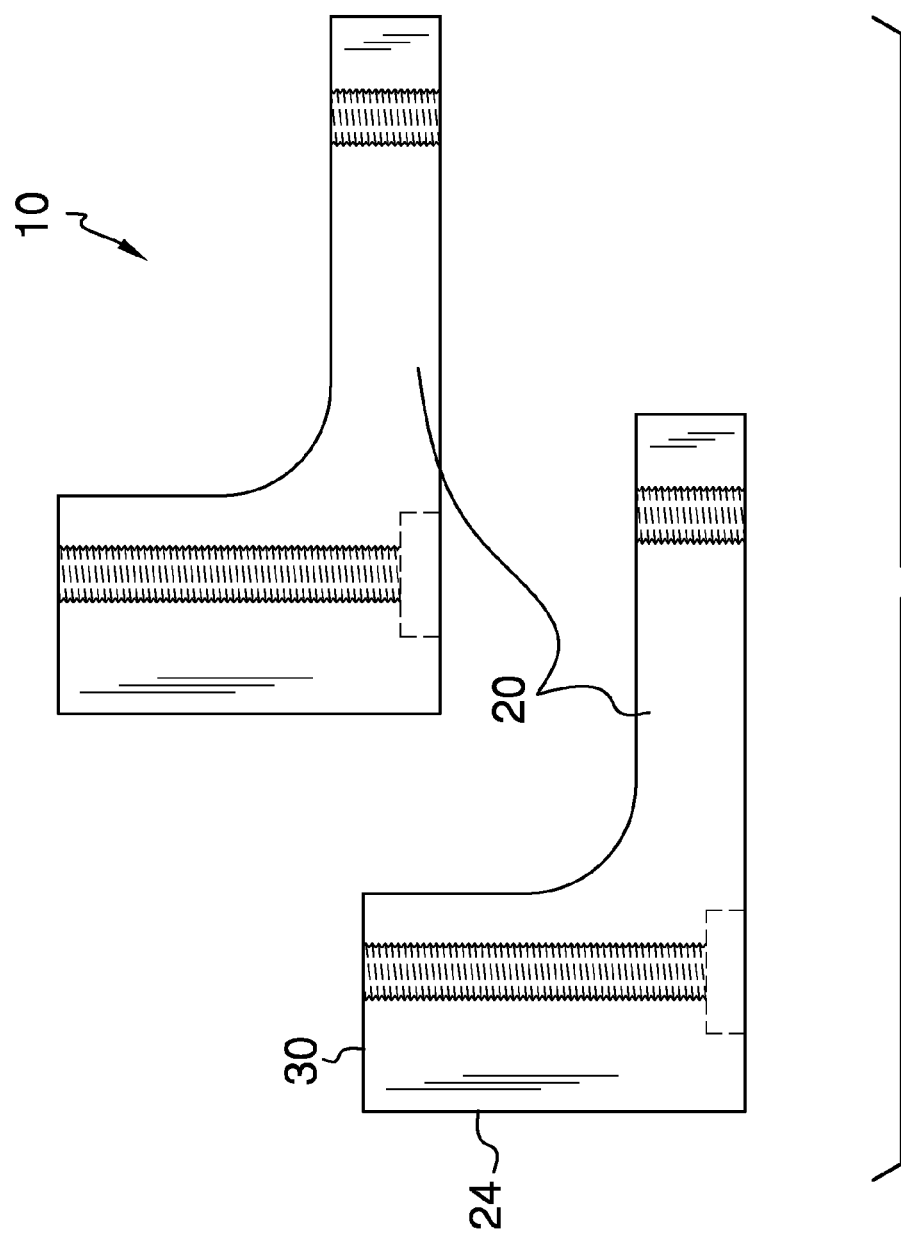
FIG. 2 is a side elevation view showing one of the pair of first mounting brackets.
Figure 3:
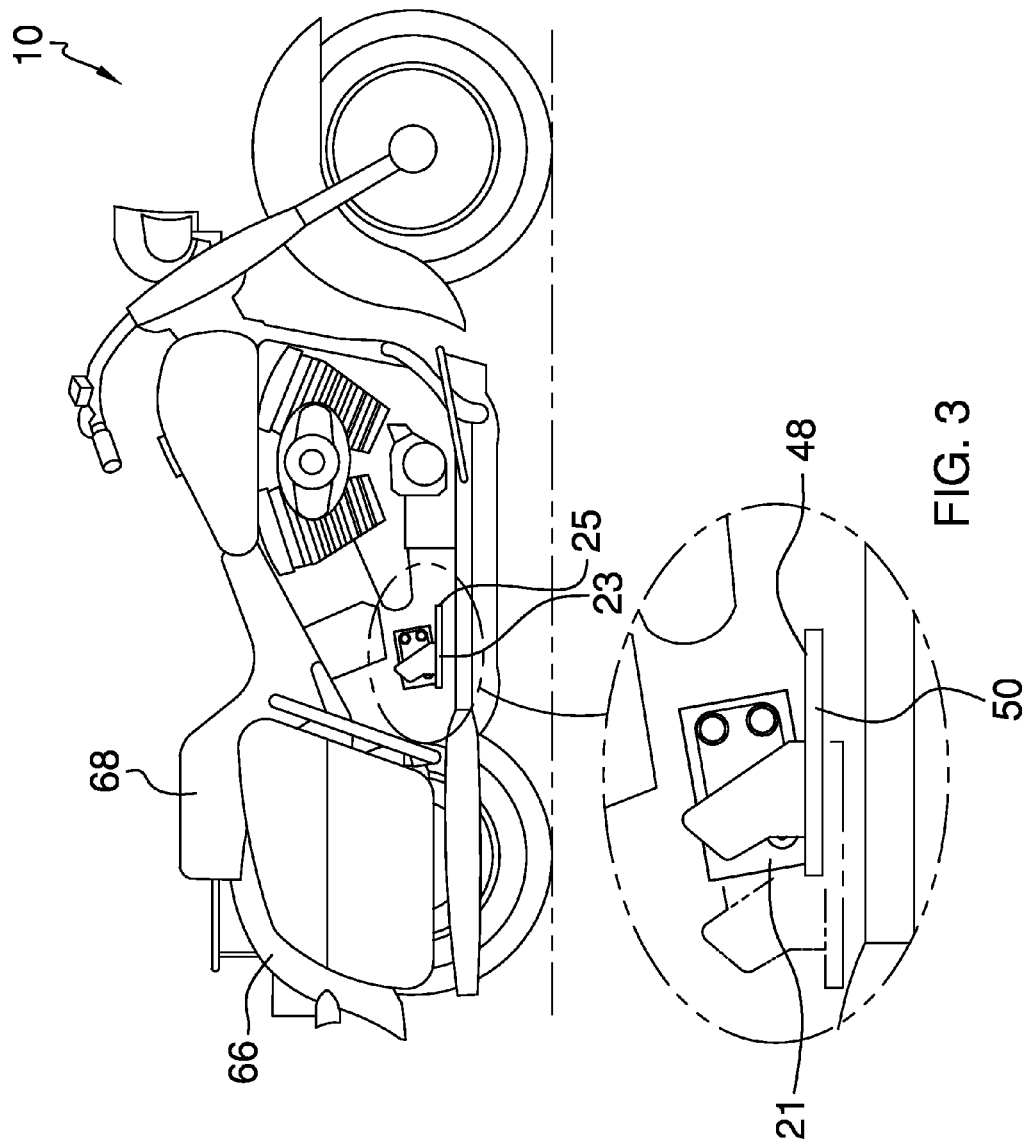
FIG. 3 is an in-use view showing a right mounting bracket of the pair of first mounting brackets.
Figure 4:
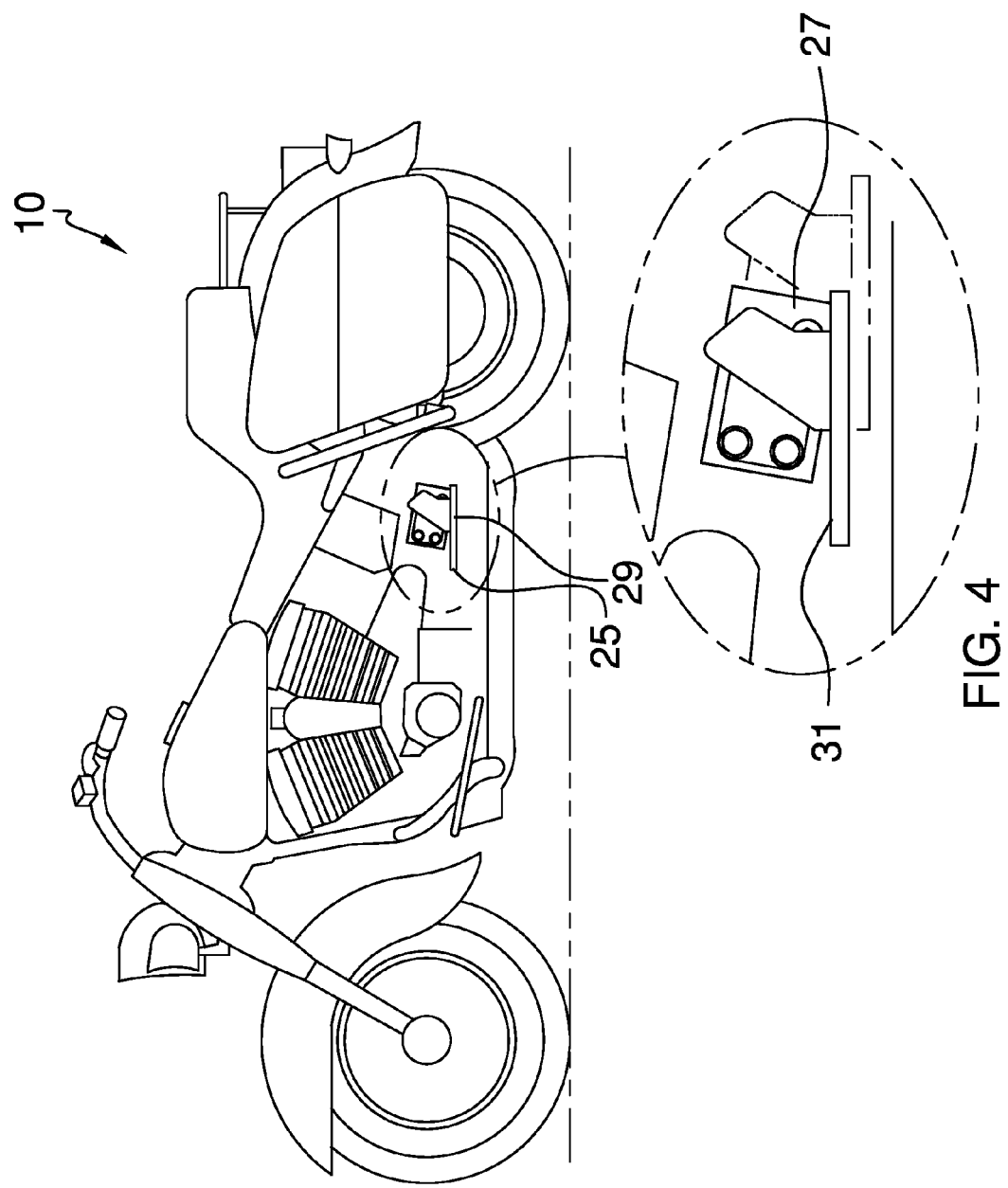
FIG. 4 is an in-use view showing a left mounting bracket of the pair of first mounting brackets.
Figure 6:
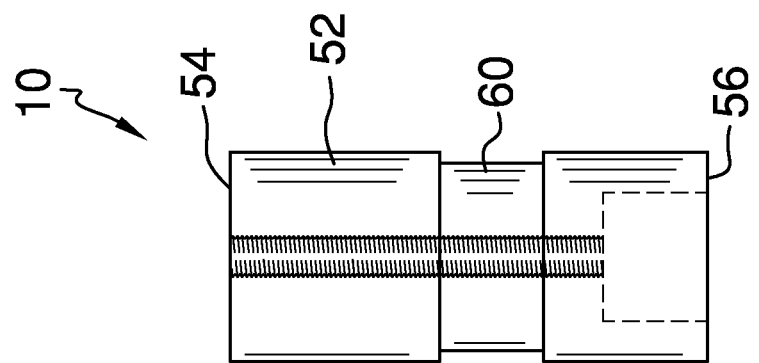
FIG. 6 is a front elevation view showing the second mounting bracket.
Figure 5:
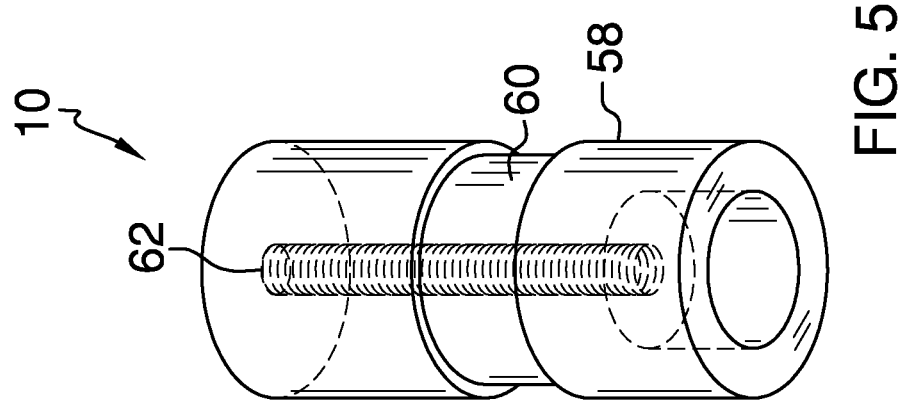
FIG. 5 is a front isometric view showing a second mounting bracket.

With reference now to the drawings, and in particular FIGS. 1 through 6 thereof, an example of the instant helmet bracket and motorcycle floorboard mount kit employing the principles and concepts of the present helmet bracket and motorcycle floorboard mount kit and generally designated by the reference number 10 will be described.

Referring to FIGS. 1 through 6, the present helmet bracket and motorcycle floorboard mount kit 10 is illustrated. The helmet bracket and motorcycle floorboard mount kit 10 includes a pair of identical L-shaped first mounting brackets 20. Each of the pair of first mounting brackets has a front surface 22, a left side surface 24 perpendicularly disposed to the front surface 22, a right side surface 26 perpendicularly disposed to the front surface 22, a curved right rear surface 28, and a left rear surface 30 perpendicularly disposed to the left side surface 24. Each of the pair of first mounting brackets 20 further comprises a pair of first threaded apertures 32 and a pair of second threaded apertures 38. The pair of first apertures 32 is continuously disposed from the front surface 22 proximal the left side surface 24 to the left rear surface 30. A top first threaded aperture 34 of the pair of first apertures 32 is disposed parallel to a bottom first threaded aperture 36 of the pair of first apertures 32. The pair of second apertures 38 is continuously disposed from front surface 22 proximal the right side surface 26 to the right rear surface 28. A top second threaded aperture 40 of the pair of second apertures 38 is disposed parallel to a bottom second threaded aperture 42 of the pair of second apertures 38.

One of a pair of first mounting bolts 44 is configured to selectively threadably engage each of the pair of first apertures 32, and one of a pair of second mounting bolts 46 is configured to selectively threadably engage each of the pair of second apertures 38. The pair of first mounting bolts 44 of each of the pair of first mounting brackets 20 and the pair of second mounting bolts 46 of each of the pair of first mounting brackets 20 are configured to removably attach a right mounting bracket 21 of the pair of first mounting brackets 20 to a top surface 48 of a right side 23 of a pair of motorcycle passenger floorboards 25 and a left mounting bracket 27 of the pair of first mounting brackets 20 to a top surface 31 of a left side 29 of the pair of motorcycle passenger floorboards 25.

The present helmet bracket and motorcycle floorboard mount kit 10 further includes a second cylindrical mounting bracket 52. The second mounting bracket 52 has a top surface 54, a bottom surface 56, and an exterior surface 58. A continuous notch 60 is substantially medially disposed between the top surface 54 of the second mounting bracket 52 and the bottom surface 56 of the second mounting bracket 52 on the exterior surface 58 of the second mounting bracket 52. A threaded opening 62 is continuously disposed from the top surface 54 of the second mounting bracket 52 to the bottom surface 56 of the second mounting bracket 52. A third mounting bolt 64 is configured to selectively threadably engage the opening 62 and removably attach the second mounting bracket 52 to a rear side 66 of a motorcycle 68.

What is claimed is:

1. A helmet bracket and motorcycle floorboard mount kit comprising:

a pair of identical L-shaped first mounting brackets, each of the pair of first mounting brackets having a front surface, a left side surface perpendicularly disposed to the front surface, a right side surface perpendicularly disposed to the front surface, a curved right rear surface, and a left rear surface perpendicularly disposed to the left side surface, wherein each of the pair of first mounting brackets further comprises:

a pair of first threaded apertures continuously disposed from the front surface proximal the left side surface to the left rear surface, wherein a top first threaded aperture of the pair of first apertures is disposed parallel to a bottom first threaded aperture of the pair of first apertures; and a pair of second threaded apertures continuously disposed from the front surface proximal the right side surface to the right rear surface, wherein a top second threaded aperture of the pair of second apertures is disposed parallel to a bottom second threaded aperture of the pair of second apertures;

wherein one of a pair of first mounting bolts is configured to selectively threadably engage each of the pair of first apertures, and one of a pair of second mounting bolts is configured to selectively threadably engage each of the pair of second apertures;

wherein the pair of first mounting bolts of each of the pair of first mounting brackets and the pair of second mounting bolts of each of the pair of first mounting brackets are configured to removably attach a right mounting bracket of the pair of first mounting brackets to a top surface of a right side of a pair of motorcycle passenger floorboards and a left mounting bracket of the pair of first mounting brackets to a left side of the pair of motorcycle passenger floorboards;

wherein a height of each of the pair of first mounting brackets from the first mounting bracket front surface to the first mounting bracket left rear surface is approximately 2.5 inches;

wherein a length of each of the pair of first mounting brackets from the first mounting bracket left side surface to the first mounting bracket right side surface is approximately 4 inches;

wherein the right mounting bracket of the pair of first mounting brackets is configured to forwardly extend the motorcycle passenger floorboard approximately 2.5 inches;

wherein the left mounting bracket of the pair of first mounting brackets is configured to forwardly extend the motorcycle passenger floorboard approximately 2.5 inches;

a second cylindrical mounting bracket having a top surface, a bottom surface, and an exterior surface;

a continuous notch substantially medially disposed between the second mounting bracket top surface and the second mounting bracket bottom surface on the second mounting bracket exterior surface; and a threaded opening continuously disposed from the second mounting bracket top surface to the second mounting bracket bottom surface;

wherein a third mounting bolt is configured to selectively threadably engage the opening and removably attach the second mounting bracket to a rear side of a motorcycle;

wherein a height of the second mounting bracket is approximately 2.5 inches;

wherein a diameter of the second mounting bracket is approximately 1.125 inches;

wherein the second mounting bracket is configured to releasably hang a helmet.

2. The helmet bracket and motorcycle floorboard mount kit of claim 1 wherein the first mounting bracket is aluminum.

3. The helmet bracket and motorcycle floorboard mount kit of claim 2 wherein the second mounting bracket is aluminum.

* * * * *